United States Patent
Kubota

[11] 3,964,881
[45] June 22, 1976

[54] PROCESS FOR GASIFICATION OF HEAVY HYDROCARBONS

[75] Inventor: Takeshi Kubota, Kyoto, Japan

[73] Assignee: Mitsui Shipbuilding and Engineering Co., Ltd., Tokyo, Japan

[22] Filed: May 2, 1975

[21] Appl. No.: 573,871

Related U.S. Application Data

[63] Continuation-in-part of Ser. No. 459,964, April 11, 1974, abandoned.

[52] U.S. Cl. .......................... 48/214 A; 252/455 R; 252/457
[51] Int. Cl.² ...................... C01B 2/16; C10G 11/28
[58] Field of Search .............. 48/214; 252/373, 459, 252/455 R, 457

[56] References Cited
UNITED STATES PATENTS

| | | | |
|---|---|---|---|
| 2,825,700 | 3/1958 | Ashley et al. | 252/459 |
| 3,119,667 | 1/1964 | McMahon | 48/214 |
| 3,385,670 | 5/1968 | Hook et al. | 252/459 |
| 3,507,811 | 4/1970 | Davies et al. | 48/214 |

FOREIGN PATENTS OR APPLICATIONS

405,604  1965  Japan .............. 252/455 R

Primary Examiner—S. Leon Bashore
Assistant Examiner—Peter F. Kratz
Attorney, Agent, or Firm—Howson and Howson

[57] ABSTRACT

A process for carrying out continuous contact steam decomposition reaction of atmospheric distillation residual oil or reduced pressure distillation residual oil at a temmperature of 700° to 1000°C. in the presence of a catalyst which has been prepared by mixing and kneading calcium oxide with 5 to 20% by weight of iron sesquioxide and 10 to 30% by weight of silicon oxide of which proportions are to be compared with the weight of said calcium oxide, or further adding proper amount of at least a member selected from the group consisting of magnesium, aluminum and chromium oxides and burning the result at high temperature.

1 Claim, 2 Drawing Figures

PROCESS FOR GASIFICATION OF HEAVY HYDROCARBONS

This application is a Continuation-In-Part of our application Ser. No. 459,964, filed Apr. 11, 1974 and now abandoned for "Process For Gasification Of Heavy Hydrocarbons".

The present invention relates to a process for the gasification of heavy hydrocarbons.

More particularly the present invention relates to a process for the production of gas with a relatively high calorific value by bringing about a contact steam decomposition reaction of atmospheric distillation residual oil and reduced pressure distillation oil. Hitherto, it is well known to bring about the contact steam decomposition reaction of hydrocarbons such as naphtha for producing gas. This process is usually carried out in external heat type tubular reactor wherein nickel oxide catalyst is used at a temperature of 650° to 900°C. under a pressure of 10 kg/cm². However it is said that this known process can not be applied on the contact steam decomposition reaction of aforesaid heavy hydrocarbons because of violent precipitation of hydrocarbons on a catalyst. Accordingly in order to gasify heavy hydrocarbons such as crude oil by contact steam decomposition reaction, internal heat type reactor of which exothermic reaction (reaction of hydrocarbon and oxygen) and endothermic reaction (contact steam decomposition reaction) are combined in switching system wherein the reaction temperature is maintained at above 1000°C. is employed without external heat of a catalytic layer. However, this process has disadvantages which are of necessity of complicate systems such as switching at elevated temperature and of necessity of application of expensive oxygen.

Recently a contact steam reforming process of hydrocarbons where in non-nickelish catalyst is employed has been proposed. This process is carried out at over 850°C. by use of calcium oxide-aluminum oxide eutectic or a composition containing more than 20% of beryllium oxide and as the residual parts aluminum oxide, calcium oxide and magnesium oxide. However it is said that a temperature over 1000°C. is required when heavy hydrocarbons such as crude oil is used. Since a gas produced according to this process is rich in hydrogen and carbon monoxide, it is an interesting process with the meaning of production of hydrogen or of production of a gas with low calorific value.

But it is thought that from the fact that such a temperature as ranging in over 1000°C. is required for the steam reforming reaction of heavy oil such as crude oil the kind of materials for apparatus is extremely limited when continuous operation is realized, and even if high quality metallic materials are possibly employed, their lives must be short in the presence of corrosive gas such as sulfur compound and of steam.

An object of the present invention is to provide a process for the production of a gas with relatively high calorific value from heavy hydrocarbons which may be carried out by the continuous contact steam decomposition reaction at a temperature ranging in relatively low temperatures.

This process may be carried out owing to the development of a catalyst which has a high activity against aforesaid reaction even in the range of low temperature and maintains said activity and by the employment of suitable reaction system.

More particularly, the catalysts effective in the present invention are a mixture prepared by sufficiently mixing and kneading calcium oxide, silicon oxide and iron sesquioxide respectively in a proper amount or a composition prepared by adding to said mixture at least a member selected from the group consisting of magnesium, aluminum and chromium oxides and subjecting the resulting mixture to high temperature burning.

Hitherto it has been known that calcium oxide has a catalytic action to steamic reaction of solid type hydrocarbons. However calcium oxide itself is labile, at elevated temperature phenomena of its' disappearance, disintegration and scattering are recognized, and its' catalytic activity is significantly low so that calcium dioxide itself is never used as a catalyst for steam reaction of hydrocarbons and is commonly used as a carrier constituent of nickel catalyst.

And it is known that iron sesquioxide is responsible for water gas conversion reaction at the reaction temperature ranging in 350° to 500°C. but there is no report that said iron sesquioxide is used as a catalyst for contact steam decomposition reaction of heavy hydrocarbons as in the present invention.

Further silicon oxide itself is, generally speaking, commonly used as an absorbent and as a catalyst it is commonly used as a carrier for the catalyst or as a cracking catalyst in the form of gel with alumina and magnesia.

The inventor of the present invention has found that a composition prepared by mixing and kneading calcium oxide, iron oxide and silicon oxide respectively in a proper amount, drying the resulting mixture and subjecting it to high temperature burning has a remarkably excellent catalytic activity for continuous contact steam decomposition reaction of atmosphere distillation residual oil and reduced pressure distillation oil.

This composition can be obtained by drying a mixed and kneaded mixture containing 5 to 20% by weight of iron sesquioxide and 10 to 30% by weight of silicon oxide to calcium oxide or a mixed and kneaded mixture prepared by adding to aforesaid mixture at least a member selected from the group consisting of magnesium, aluminum and chromium oxides in proper amount and subjecting them to high temperature burning at about 1700°C. This is revealed due to the burning of aforesaid mixed and kneaded mixture containing proper amounts of aforesaid three different oxides but this can not be satisfied when even one of said three oxides is inferior or superior to said proper amount in quantity.

The catalysts thus obtained exhibit an excellent activity even in the range of low temperature for continuous contact steam decomposition reaction of atmospheric distillation residual oil and reduced pressure residual oil and troubles such as precipitation of carbon etc. on a catalyst are not generated.

It is thought that the reason that continuous contact steam decomposition reaction of heavy hydrocarbons such as atmospheric distillation oil and reduced pressure distillation oil was impossible in the known process may be caused by change in quality of the catalyst itself at elevated temperature and deposit or appearance of carbon which is generated by polycondensation or olefins formed at the time of decomposition reaction on the catalyst. Aforesaid catalysts according to the present invention have an excellent stability at elevated temperature and a catalytically active point suitable for making olefins formed at the time of decomposition reaction stable on the surface of catalyst and promptly carrying out the reaction of steam and heavy hdyrocarbons or carbon produced.

It is thought that aforesaid properties are probably revealed due to the fact that calcium oxide, iron sesquioxide, calcium oxide iron oxide composition ($CaO-Fe_2O_3$) and the like are present in the form of being dispersed to the desired degree in firm calcium oxide — silicon oxide composition ($\alpha-2CaO-SiO_2$, $3CaO-SiO_2$ etc.) and in their stereostructural relationship on during progress of the reaction at least a part of them is present in the form of sulfide.

In order to further enhance the strength of catalyst and increase the stability of it, at least a member selected from the group consisting of magnesium, aluminum and chromium oxides is added thereto and the mixture is burnt at high temperature.

Particularly magnesium oxide is desirable because it forms with silicon oxide a firm composition such as forsterite ($2MgO-SiO_2$). In addition as a mixing and kneading agent it is possible to add a material having a desirably clayish property of high plasticizability for instance a clayish material basicly substituted by alkali metal.

The catalyst thus obtained does not exhibit phenomena of deformation, scattering and disappearance even in the range of the temperature at which contact steam decomposition reaction is carried out, even in corrosive gaseous atmosphere of like sulfur compound and even in steamy atmosphere, is highly active against aforesaid reaction and may have maintain the activity in stable state.

The inventor has carried out continuous contact steam decomposition reaction wherein as representative examples among heavy hydrocarbons, atmospheric distillation residual oil of Kuwait oil and reduced pressure residual oil of Kuwait oil (shown in the below Table) were selected and fluidized-bed reactor was employed. The reason that said fluidized-bed reactor was used in that the reaction must have been the most desirable for extremely dispersing the starting heavy hydrocarbon and steam and increasing the catalytic efficiency on a catalyst.

| Properties Of Kuwait Atmospheric Distillation Residual Oil | | |
| --- | --- | --- |
| Density (15/4°C.) | | 0.966 |
| Viscosity (cst 50°C.) | | 440 |
| Sulfur content (wt%) | | 4.1 |
| Residual carbon (wt%) | | 9.4 |
| Asphalten (n-pentan-insoluble component, wt%) | | 2.6 |
| Metallic component (wt ppm) | V: | 45 |
| | N: | 15 |

| Properties Kuwait Reduced Pressure Distillation Residual Oil | | |
| --- | --- | --- |
| Density (15/4°C.) | | 1.03 |
| Viscosity (cst 98.9°C.) | | 2900 |
| Sulfur content (wt%) | | 5.6 |
| Residual carbon (wt%) | | 21 |
| Asphaltens (n-pentan-insoluble component, wt%) | | 5.6 |
| Metallic component (wt ppm) | V: | 130 |
| | N: | 30 |

As the result, when the temperature of catalyst bed is superior to 800°C., deterioration of catalytic activity is not recognized in continuous experiments and even after used for 50 hours carbon deposit on the catalyst does not occur.

In the above mentioned process according to the present invention the contact steam decomposition reaction of the starting heavy hydrocarbon is brought about at a temperature ranging in relatively low temperatures of above 800°C. to produce relatively high calorific gas of 3000 to 6000 Kcal and even after continuous operation for a long time no carbon deposit on the catalyst is recognized.

Also the process according to the present invention can be carried out at a temperature of 700° to 800°C. In this case carbon deposit to certain degree on the catalyst is unavoidable but the content of olefins such as ethylene, propylene etc. is increased in gas produced so that it is effective for the production of high calorific gas of about 6,000 to 10,000 $Kcal/Nm^3$ or olefins by-produced. When the process according to the present invention is operated at a temperature ranging in such low temperatures, it is necessary to provide certain catalyst regenerating apparatus for the removal of carbon somewhat deposited on the catalyst. For this purpose fluidizing and circulating system provided with reaction zone and regeneration zone as frequently used on other known fluidized bed reactor between which a catalyst is circulated can be employed. In this case the catalysts can be used in the form of fine granule as employed in conventional process and they act as not only a catalyst but also a heat transfer medium.

Accordingly the characteristic of the present invention is present in that contact steam decomposition reaction of heavy hydrocarbons containing a large amount of sulfur content such as atmospheric distillation residual oil and reduced pressure distillation residual oil is carried out at a temperature of 700° to 1000°C. wherein one of the catalysts prepared by mixing and kneading calcium oxide, in the proportion to the weight of said calcium oxide 5 to 20% by weight of iron sesquioxide and 10 to 30% by weight of silicon oxide or further adding to the resulting mixture at least a member selected from the group consisting of magnesium, aluminum and chromium oxides, and subjecting them to high temperature burning is used.

The starting materials for the preparation these catalysts are preferably pure but may contain some impurities. For instance as the starting calcium oxide a natural compound such as dolomite is possibly used. The present invention will now be explained hereunder with examples.

In the examples fluidized bed reactor made of stainless steel of which diameter is 2 ½ inches and length is 1200 mm was used. The catalyst was formed in granule of about 0.5 mm diameter size and charged in reaction tube by 500 cc. The reaction tube was externally heated by electric furnace provided thereon, and through the bottom part of which Kuwait atmospheric distillation residual oil or reduced pressure distillation residual oil and steam were respectively introduced.

Ratio of carbon weight of steam/starting oil is 3.0 and the superficial velocity in column is 20 cm/sec. The fluidizing condition of a catalyst in experiments was remarkably smooth and any trouble such as aggregation of a catalyst was not recognized.

EXAMPLE 1

Figure 1:
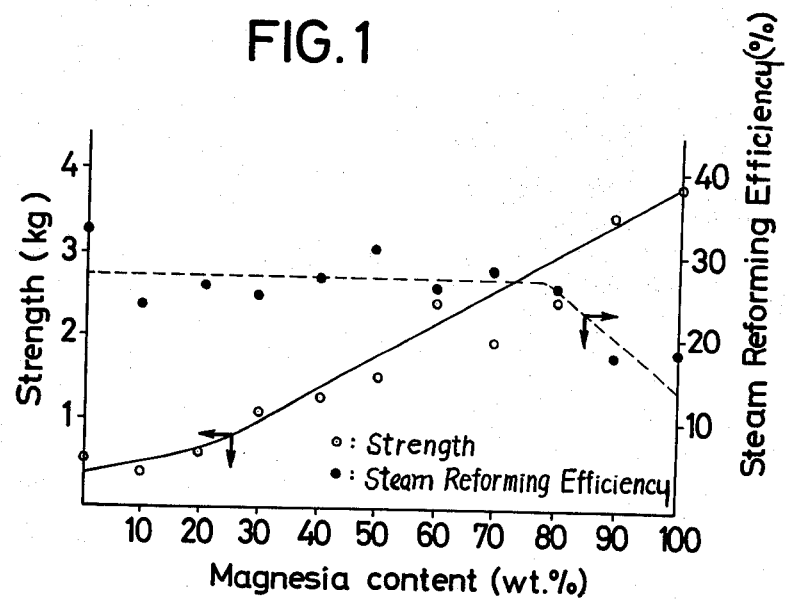
FIG. 1 is a diagram showing the magnesia content vs. strength and activity.

To calcium oxide, iron sesquioxide and silicon oxide respectively in the amounts stated in the below Table were added, sufficiently mixed and kneaded, dried and burnt at 1700°C. for about 20 hours to obtain various catalysts. Contact steam decomposition reaction in fluidized bed reactor of said Kuwait atmospheric distillation residual oil was carried out wherein said various catalysts were used, thereby to obtain the results shown in the below Table. The reaction conditions therein were all under atmospheric pressure at 950°C. And the date shown in the below Table are those obtained when the reactions become a steady state.

The data shown in the following Table are those obtained when the reactions become a steady state.

| No of Catalyst | The amount of $Fe_2O_3$ (Wt%) | The amount of $SiO_2$ (Wt%) | Composition Of Product Gas (%) | | | | | Carbon Deposit On A Catalyst After Reaction For 50 hrs. |
|---|---|---|---|---|---|---|---|---|
| | | | $H_2$ | CO | $CO_2$ | $CH_4$ | $C_2^+$ | |
| 106 | 10 | 5 | 51.8 | 10.3 | 19.4 | 10.2 | 8.3 | Present |
| 107 | 10 | 10 | 50.9 | 13.8 | 17.6 | 10.6 | 7.1 | None |
| 103 | 10 | 15 | 54.3 | 12.5 | 18.1 | 11.1 | 2.7 | None |
| 108 | 10 | 30 | 53.1 | 11.8 | 18.6 | 10.9 | 5.6 | None |
| 109 | 10 | 35 | 49.8 | 11.8 | 19.2 | 11.3 | 7.9 | Present |

In the case No. 106 catalyst, disintegration phenomenon of a catalyst during reaction was recognized. From these results the amount of silicon oxide to be added to calcium oxide seems to be preferably 10 to 30% by weight.

EXAMPLE 3

Contact steam decomposition reaction in fluidized bed reactor of aforesaid atmospheric distillation residual oil was carried out wherein No. 103 catalyst used in Exmaple 1 was used thereby to obtain the results shown in the following Table. However all the reactions were carried out under atmospheric pressure. The data shown in the following Table are those obtained when the reaction become a steady state.

| No. of Catalyst | The Amount of $Fe_2O_3$ (Wt%) | The Amount of $SiO_2$ (Wt%) | Composition Of Product Gas (%) | | | | | Carbon Deposition On A Catalyst After Reaction for 50 hrs. |
|---|---|---|---|---|---|---|---|---|
| | | | $H_2$ | CO | $CO_2$ | $CH_4$ | $C_2^+$ | |
| 101 | 3 | 15 | 52.1 | 12.5 | 18.8 | 10.8 | 5.4 | Present |
| 102 | 5 | 15 | 52.8 | 13.3 | 17.9 | 11.2 | 4.8 | None |
| 103 | 10 | 15 | 54.3 | 12.5 | 18.1 | 11.1 | 2.7 | None |
| 104 | 20 | 15 | 53.0 | 13.6 | 19.6 | 9.5 | 4.3 | None |
| 105 | 25 | 15 | 49.8 | 11.7 | 18.2 | 10.5 | 5.4 | Present |

From the results it will be seen that the amount of iron sesquioxide to be added to calcium oxide is preferably 5 to 20% by weight.

| Reaction Temperature °C. | Composition Of Product Gas (%) | | | | | Carbon Deposit On A Catalyst After Reaction For 50 hrs. |
|---|---|---|---|---|---|---|
| | $H_2$ | CO | $CO_2$ | $CH_4$ | $C_2^+$ | |
| 700 | 33.2 | 4.1 | 9.9 | 25.3 | 27.5 | Present |
| 800 | 47.3 | 5.3 | 21.7 | 14.2 | 11.7 | None |
| 860 | 54.9 | 4.9 | 21.3 | 9.6 | 9.2 | None |
| 950 | 54.3 | 12.5 | 18.1 | 11.1 | 2.7 | None |

From these results at a temperature of above 800°C. almost perfectly no carbon deposit on a catalyst is appeared.

EXAMPLE 2

To calcium oxide, iron sesquioxide and silicon oxide respectively in the amounts stated in the below Table were added, sufficiently mixed and kneaded, dried, and burnt at 1700°C. for about 20 hours to obtain various catalysts. Contact steam decomposition reaction in fluidized bed reactor of aforesaid Kuwait atmospheric distillation residual oil was carried out wherein said various catalysts were used thereby to obtain the results shown in the following Table. The reaction conditions therein were all under atmospheric pressure at 950°C.

EXAMPLE 4

Contact steam decomposition reaction in fluidized bed reactor of aforesaid Kuwait reduced pressure distillation residual oil was carried out wherein No. 103 catalyst used in Example 1 was employed thereby to obtain the results shown in the following Table. However all the reactions were carried out under atmospheric pressure. The data shown in the following Table are those obtained when the reactions become a steady state.

| Reaction Temperature °C. | Composition Of Product Gas (%) | | | | | Carbon Deposit On A Catalyst After Reaction For 50 hrs. |
|---|---|---|---|---|---|---|
| | $H_2$ | CO | $CO_2$ | $CH_4$ | $C_2^+$ | |
| 800 | 39.4 | 4.5 | 18.2 | 11.9 | 26.0 | Present |
| 870 | 44.6 | 5.6 | 18.8 | 11.6 | 9.4 | None |
| 950 | 51.4 | 12.4 | 19.4 | 10.4 | 6.4 | None |
| 1000 | 54.5 | 20.8 | 16.3 | 5.2 | 3.2 | None |

From these results when the reaction temperature is a temperature of about 870°C. carbon deposit on a catalyst can be absolutely prevented.

EXAMPLE 5

To a product (CaO 54.5%, MgO 41.2%) obtained by burning a natural dolomite at 900°C. for 5 hours, 5% by weight of iron sesquioxide and 10% by weight of silicon oxide respectively in the weight proportions to said CaO component were added, sufficiently mixed and kneaded, dried and burnt at 1700°C. for about 20 hours thereby to obtain a catalyst (Catalyst No. 110). Further, to the catalyst a natural dolomite is added and burnt at 1700°C. for about 20 hours to obtain a catalyst (Catalyst No. 111). Contact steam decomposition reaction of aforesaid Kuwait atmospheric pressure distillation oil was carried out wherein the catalysts above obtained were used thereby to obtain the results shown in the following Table. However the reaction conditions are all under atmospheric pressure at 950°C. And the data shown in the following Table are those obtained when the reactions become a steady state.

| No. of Catalyst | Composition Of Product Gas (%) | | | | | Carbon Deposit On A Catalyst After Reaction For 50 Hrs. |
|---|---|---|---|---|---|---|
| | $H_2$ | CO | $CO_2$ | $CH_4$ | $C_2^+$ | |
| 110 | 52.7 | 11.1 | 19.0 | 9.8 | 7.4 | None |
| 111 | 47.3 | 7.0 | 11.6 | 14.5 | 19.6 | Present |

From these results it is possible to use a material containing calcium and magnesium such as burnt dolomite and a trace amount of aluminum, silicon and iron as the raw material for the preparation of the catalyst used in the present invention.

EXAMPLE 6

Calcium oxide, mixed with 15% by weight of ferric oxide, 28% by weight of silica and 0 –100% by weight of magnesia as a reinforcing agent, is kneaded, dried and calcinated at 1700°C. about 20 hours. The obtained catalyst in the form of tablets of 0.5 mm in diameter is tested of strength and activity, thus providing the results as shown in FIG. 1.

In this test, the strength was determined by the method of loading gradually a tablet sample with weight and finding the weight (Kg) for rupture. In the activity test, the aforementioned normal pressure distillation residual oil from Kuwait was subjected to the catalytic steam decomposition by a fluidized bed reactor at 950°C. under the normal pressure so as to determine how much percentage of the carbon atoms in raw oil is affected by the water gas-forming reaction, according to the formula:

$$\text{Steam Reforming Efficiency} = \frac{\text{Carbon amount (by wt.) Converted to CO \& CO}_2}{\text{Carbon amount in feed oil}}$$

As will be understood from FIG. 1, the strength increases not so much till the addition amount of magnesia reaches about 20% by weight, but after then it rises in proportion to the addition amount. On the other hand, the steam reforming efficiency is constant independently fron the addition amount till it reaches an addition amount of about 80% and the catalyst does not present any reduction of activity, but above an addition of 80% the activity is reduced while carbon deposits on the catalyst. Consequently it turned evident that the optimum addition amount of magnesia as the enforcement agent would be 20 – 80% by weight on the base of calcium oxide.

EXMAPLE 7

Calcium oxide, mixed with 10% by weight of ferric oxide, 15% by weight of silica and 0 – 100% by weight of alumina as a reinforcing agent, is kneaded, dried and calcinated at 1700°C. about 20 hours. The obtained catalyst in the form of tablets of 0.5 mm in diameter is tested of strength and activity in the process as shown in Example 6, thus providing the results as shown in FIG. 2.

Figure 2:
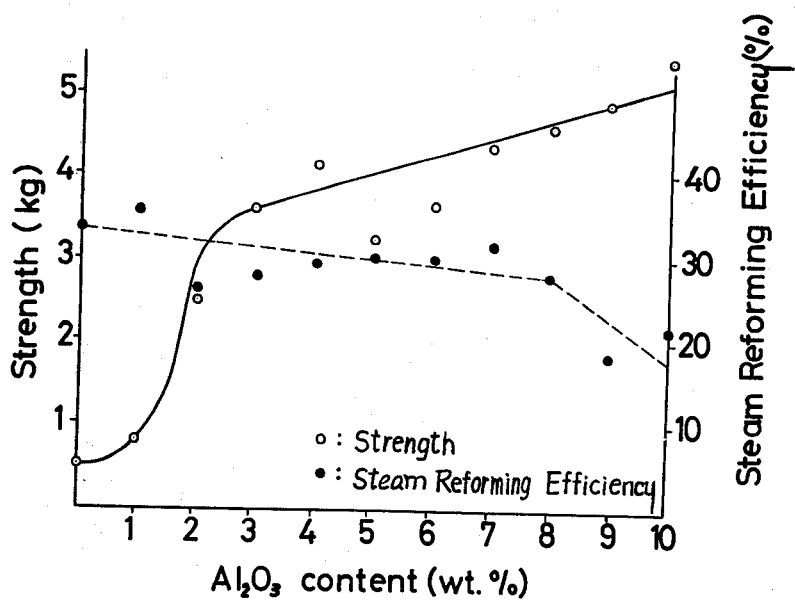
FIG. 2 is a diagram showing $Al_2O_3$ content vs. strength and activity.

As will be understood from FIG. 2, the strength increases remarkably even with an addition amount of alumina even at the level of 2% by weight. For addition amounts more than 8% by weight, however, the activity of catalyst is seen and the carbon deposit is found on surface of catalyst. Therefore, the addition amount of alumina as a reinforcing agent should preferably be from 1 – 8% by weight on the base of calcium oxide.

Similar test with chromium oxide revealed that, as the addition amount of chromium oxide relative to that of calcium oxide increases, the strength increases gradually but becomes constant after having reached 20% by weight. The activity, however, is not reduced, nor carbon appears on the catalyst. Consequently, the addition amount of chromium oxide as a reinforcing agent should preferably be from 1 – 20% by weight on the base of calcium oxide.

I claim:

1. A continuous process for the catalytic steam decomposition of a residual oil, derived from the atmospheric or reduced pressure ditillation of oil, to completely gasify said residual oil to produce an olefin-containing gas which comprises:

gasifying and decomposing said residual oil with steam at a temperature in the range from about 700° to about 1000°C. in the presence of a catalyst obtained by mixing, kneading and firing a composition consisting essentially of calcium oxide containing about 5 to about 20% ferric oxide, about 10 to about 30% silica, and at least one other oxide selected from the group consisting of magnesia, alumina, and chromium oxide, the amounts of said oxide being about 20 to about 80%, about 1 to about 8%, and about 1 to about 20%, respectively for said oxides, all of said percentages being by weight based on said calcium oxide.

* * * * *